United States Patent
Onimoto et al.

(10) Patent No.: US 11,692,850 B2
(45) Date of Patent: Jul. 4, 2023

(54) ROTATION DETECTION DEVICE AND CABLE WITH SENSOR

(71) Applicant: Hitachi Metals, Ltd., Tokyo (JP)

(72) Inventors: Takashi Onimoto, Tokyo (JP); Teruyoshi Shirota, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/729,358

(22) Filed: Apr. 26, 2022

(65) Prior Publication Data
US 2022/0252426 A1 Aug. 11, 2022

Related U.S. Application Data (63) Continuation of application No. 17/032,447, filed on Sep. 25, 2020, now Pat. No. 11,346,686, which is a (Continued)

(30) Foreign Application Priority Data

Jun. 23, 2016 (JP) .................................. 2016-124582

(51) Int. Cl.
*G01D 5/14* (2006.01)
*G01P 3/487* (2006.01)
(Continued)

(52) U.S. Cl.
CPC .............. *G01D 5/142* (2013.01); *F16C 41/00* (2013.01); *G01D 5/16* (2013.01); *G01D 5/245* (2013.01);
(Continued)

(58) Field of Classification Search
CPC .......... G01D 5/142; G01D 5/16; G01D 5/245; G01D 15/12; G01D 5/2515; G01D 5/145;
(Continued)

(56) References Cited

U.S. PATENT DOCUMENTS

| 7,906,961 B2 | 3/2011 | Abwa et al. |
| 8,089,233 B2 | 1/2012 | Kanekawa et al. |

(Continued)

FOREIGN PATENT DOCUMENTS

| CN | 101377401 A | 3/2009 |
| CN | 203387021 A | 1/2014 |

(Continued)

OTHER PUBLICATIONS

Notice of Allowance in U.S. Appl. No. 17/032,447 dated Feb. 1, 2022.
(Continued)

*Primary Examiner* — Jermele M Hollington
*Assistant Examiner* — Taqi R Nasir
(74) *Attorney, Agent, or Firm* — McGinn I.P. Law Group, PLLC.

(57) ABSTRACT

A cable with sensor, including a cable, and a sensor section provided at an end of the cable. The sensor section includes a plurality of magnetic sensors each including a detection section that includes a magnetism detection element and a cover covering the magnetism detection element, and a housing portion coating the plurality of magnetic sensors and the cable. The cable is extending out of the housing portion. The respective detection sections are arranged to be aligned with each other in a direction intersecting with an extending direction of the cable from the housing portion of the cable.

22 Claims, 5 Drawing Sheets

Related U.S. Application Data continuation of application No. 16/091,864, filed as application No. PCT/JP2017/023030 on Jun. 22, 2017, now Pat. No. 10,816,360.

(51) Int. Cl.

| | |
|---|---|
| *G01D 5/245* | (2006.01) |
| *F16C 41/00* | (2006.01) |
| *G01L 5/16* | (2020.01) |
| *G01D 5/16* | (2006.01) |
| *F16C 19/18* | (2006.01) |
| *B60T 8/171* | (2006.01) |
| *H01B 9/00* | (2006.01) |

(52) U.S. Cl.
CPC ............... *G01L 5/16* (2013.01); *G01P 3/487* (2013.01); *B60T 8/171* (2013.01); *F16C 19/18* (2013.01); *H01B 9/003* (2013.01)

(58) Field of Classification Search
CPC .......... G01D 5/147; G01D 5/12; F16C 41/00; G01P 3/487
See application file for complete search history.

(56) References Cited

U.S. PATENT DOCUMENTS

| | | | |
|---|---|---|---|
| 9,000,301 B2 | 4/2015 | Hayakawa et al. | |
| 10,509,050 B2 | 12/2019 | Welsch et al. | |
| 2004/0232906 A1* | 11/2004 | Taneyhill | G01P 3/488 |
| | | | 324/179 |
| 2005/0007105 A1 | 1/2005 | Siegle | |
| 2005/0218888 A1 | 10/2005 | Sethu | |
| 2007/0164734 A1 | 7/2007 | Shimizu | |
| 2009/0058407 A1* | 3/2009 | Kanekawa | G01D 5/14 |
| | | | 324/228 |
| 2009/0206827 A1 | 8/2009 | Aimuta | |
| 2009/0315547 A1 | 12/2009 | Abwa et al. | |
| 2012/0194175 A1* | 8/2012 | Ausserlechner | G01D 5/2451 |
| | | | 29/595 |
| 2013/0277087 A1* | 10/2013 | Hayakawa | B60R 16/0215 |
| | | | 174/107 |
| 2016/0161289 A1 | 6/2016 | Fujita | |
| 2017/0153265 A1 | 6/2017 | Yamamoto et al. | |
| 2018/0024156 A1 | 1/2018 | Welsch et al. | |

FOREIGN PATENT DOCUMENTS

| | | |
|---|---|---|
| DE | 10 2005 060 713 A1 | 6/2007 |
| DE | 10 2015 202 333 A1 | 8/2016 |
| JP | 2009-058291 A | 3/2009 |
| JP | 2013-047636 A | 3/2013 |
| JP | 2013-237428 A | 11/2013 |
| JP | 2016-109554 A | 6/2016 |

OTHER PUBLICATIONS

German Office Action, dated Jun. 7, 2021, in German Application No. 11 2017 001 253.8 and English Translation thereof.
International Search Report (ISR) (PCT Form PCT/ISA/210), in PCT/JP2017/023030 dated Sep. 19, 2017.
Chinese Office Action dated Feb. 3, 2020, in Chinese Application No. 201780018600.2 dated English translation thereof.
Japanese Office Action dated Jun. 9, 2020, Japanese Patent Application No. 2016-124582 with an English translation.
Notification of Transmittal of Translation of the International Preliminary Report on Patentability (PCT Form PCT/IB/338), PCT/JP2017/023030 dated Jan. 3, 2019.
International Preliminary Report on Patentability (PCT Form PCT/IB/373), in PCT/JP2017/023030 dated Dec. 25, 2018.
Translation of Written Opinion of the International Searching Authority (PCT Form PCT/ISA/237) in PCT/JP2017/023030 dated Sep. 19, 2017.

* cited by examiner

ROTATION DETECTION DEVICE AND CABLE WITH SENSOR

CROSS-REFERENCE TO RELATED APPLICATIONS

The present application is a Continuation Application of U.S. patent application Ser. No. 17/032,447, filed on Sep. 25, 2020, which is a Continuation Application of U.S. patent application Ser. No. 16/091,864, now U.S. Pat. No. 10,816, 360 B2, filed on Oct. 5, 2018, which is based on International Application PCT/JP2017/023030, filed on Jun. 22, 2017, which is based on Japanese patent application No. 2016-124582, filed on Jun. 23, 2016, the contents of which is incorporated herein by reference in its entirety.

TECHNICAL FIELD

The present invention relates to a rotation detection device and a cable with sensor.

BACKGROUND ART

A rotation detection device used on a bearing unit of a wheel to detect a rotational speed of a rotating member rotating with the wheel is known (see, e.g., JP 2013/47636 A).

JP 2013/47636 A discloses a rotation detection device provided with a detected member which is attached to a rotating member and has plural magnetic poles along a circumferential direction of the rotating member, and a magnetic sensor which is attached to a stationary member rotatably supporting the rotating member and has a detection element for detecting a magnetic field of the detected member.

CITATION LIST

Patent Literature

JP 2013/47636 A

SUMMARY OF INVENTION

Technical Problem

Rotation detection devices for measuring a rotational speed of a wheel are desired to have plural magnetic sensors so that the rotational speed of wheel can be detected even in case of failure, etc., of a certain magnetic sensor or so that the rotational speed of wheel can be detected more accurately.

When mounting plural magnetic sensors on a sensor section, the size of the entire sensor section is increased and this may cause a problem that, e.g., it is not possible to insert the sensor section into a sensor section-holding hole. Therefore, there is a demand for a sensor section which can keep a small size even when mounting plural magnetic sensors.

It is an object of the invention to provide a rotation detection device and a cable with sensor in which a sensor section can have a small size while having plural magnetic sensors.

Solution to Problem

To solve the above-mentioned problem, a rotation detection device in an aspect of the invention is provided with a detected member that is mounted to a rotating member and has a plurality of magnetic poles arranged in a circumferential direction about a rotational axis of the rotating member; and a sensor section that is mounted to a stationary member not rotating with rotation of the rotating member and is arranged to face the detected member, wherein the sensor section comprises a plurality of magnetic sensors each comprising a plate-shaped detection section that comprises a magnetism detection element for detecting a magnetic field from the detected member, a signal processing circuit for processing a signal output from the magnetism detection element, and a cover collectively covering the magnetism detection element and the signal processing circuit, the detection sections are stacked in a direction along which the sensor section and the detected member face each other, and the magnetic sensor arranged farthest from the detected member has higher sensitivity than the magnetic sensor arranged closest to the detected member.

Also to solve the above-mentioned problem, a cable with sensor in an aspect of the invention is for a rotation detection device comprising a detected member that is mounted to a rotating member and has a plurality of magnetic poles arranged in a circumferential direction about a rotational axis of the rotating member, and a sensor section that is mounted to a stationary member not rotating with rotation of the rotating member and is arranged to face the detected member, and the cable with sensor is provided with a cable; and the sensor section provided at an end of the cable, wherein the sensor section comprises a plurality of magnetic sensors each comprising a plate-shaped detection section that comprises a magnetism detection element for detecting a magnetic field from the detected member, a signal processing circuit for processing a signal output from the magnetism detection element, and a cover collectively covering the magnetism detection element and the signal processing circuit, and the detection sections are stacked in a direction along which the sensor section and the detected member face each other.

Advantageous Effects of Invention

Provided according to an aspect of the invention are a rotation detection device and a cable with sensor in which a sensor section can have a small size while having plural magnetic sensors.

DESCRIPTION OF EMBODIMENTS

Embodiment

An embodiment of the invention will be described below in conjunction with the appended drawings.

(Configuration of Wheel Bearing Device 10)

Figure 1:
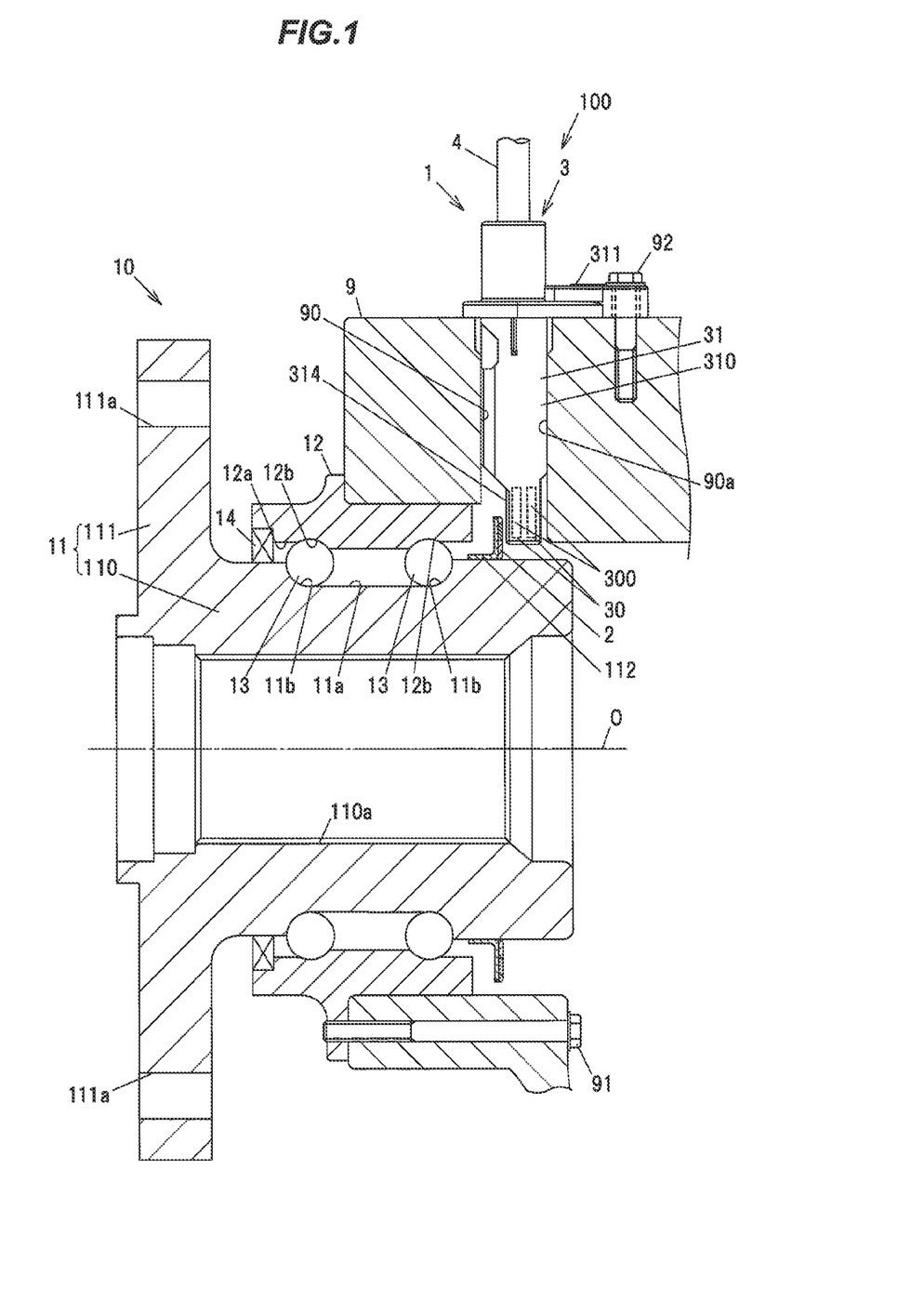
FIG. 1 is a cross sectional view showing a rotation detection device in an embodiment of the present invention and a vehicle wheel bearing device having the rotation detection device.

FIG. 1 is a cross sectional view showing a rotation detection device in the present embodiment and a vehicle wheel bearing device having the rotation detection device.

The wheel bearing device 10 is provided with an inner race 11 as a rotating member having a cylindrical main body 110 and a flange 111 to be attached to a wheel, an outer race 12 arranged on the outer peripheral side of the main body 110 of the inner race 11, plural spherical rolling elements 13 arranged between a pair of raceway surfaces 11b, 11b formed on an outer surface 11a of the inner race 11 and a pair of raceway surfaces 12b, 12b formed on an inner surface 12a of the outer race 12 and roll and move on the raceway surfaces 11b and 12b, and a rotation detection device 1 for detecting a rotational speed of the inner race 11 with respect to the outer race 12 (i.e., a wheel speed).

A through-hole is formed at the middle portion of the main body 110 of the inner race 11 along a rotational axis line O thereof and a spline fitting portion 110a for coupling a drive shaft (not shown) is formed on an inner surface of the through-hole. The pair of raceway surfaces 11b, 11b of the inner race 11 are formed parallel to each other and extend in a circumferential direction.

The flange 111 of the inner race 11 is provided integrally with the main body 110 so as to protrude radially outward of the main body 110. The flange 111 has plural through-holes 111a into which bolts for attachment to a wheel (not shown) are press-fitted.

The outer race 12 is formed in a cylindrical shape and is fixed, by plural bolts 91 (only one bolt 91 is shown in FIG. 1), to a knuckle 9 which is coupled to a vehicle body. The knuckle 9 is an example of the stationary member which rotatably supports the inner race 11. The pair of raceway surfaces 12b, 12b of the outer race 12 are formed parallel to each other and extend in a circumferential direction so as to face the pair of raceway surfaces 11b, 11b of the inner race 11. At an end of the outer race 12 on the side where the flange 111 of the inner race 11 is located, a sealing 14 is arranged between the inner race 11 and the outer race 12.

A holding hole 90 for holding a sensor section 3 of the rotation detection device 1 (described next) is formed on the knuckle 9. The holding hole 90 has a circular shape in the cross section perpendicular to the central axis thereof and penetrates the knuckle 9 in a radial direction from the rotational axis line O.

(Rotation Detection Device 1)

Figure 2:
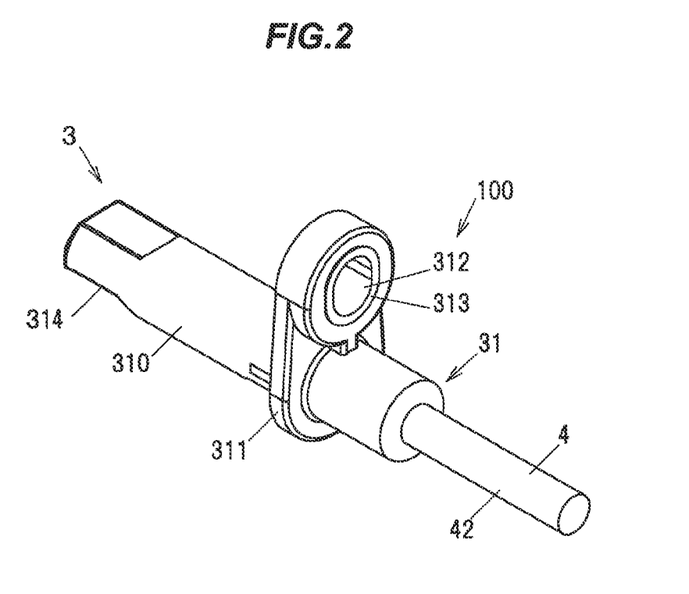
FIG. 2 is a perspective view showing a sensor section.
Figure 3A:
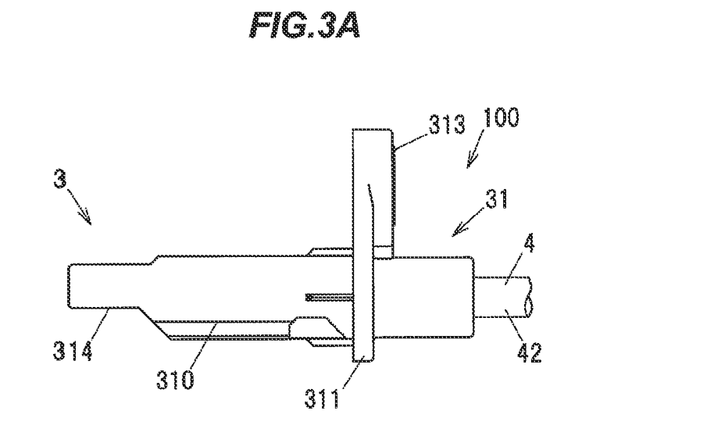
FIG. 3A is a side view showing the sensor section.
Figure 3B:
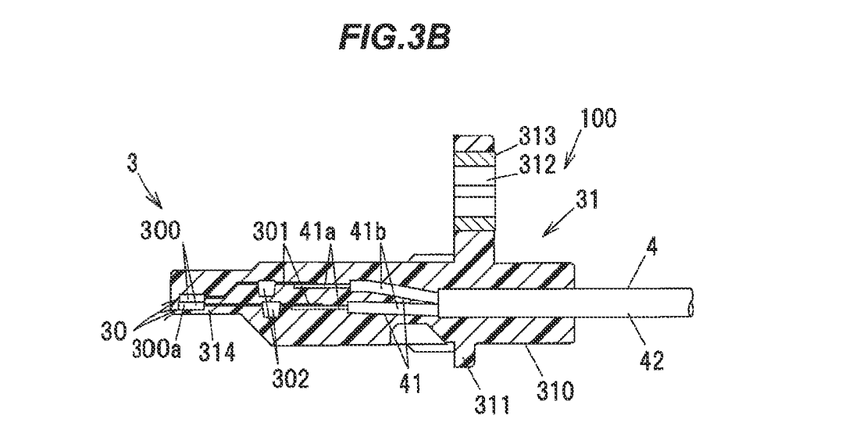
FIG. 3B is a cutaway diagram of FIG. 3A, in which a housing is shown as the cross section.
Figure 4A:
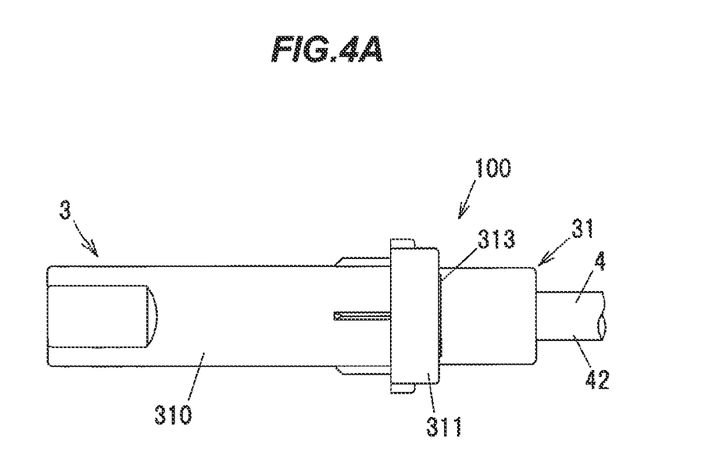
FIG. 4A is a top view showing the sensor section.
Figure 4B:
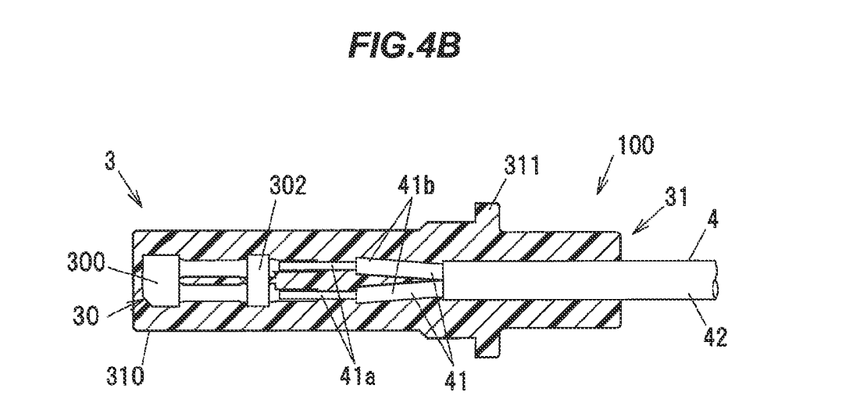
FIG. 4B is a cutaway diagram of FIG. 4A, in which the housing is shown as the cross section.
Figure 4C:
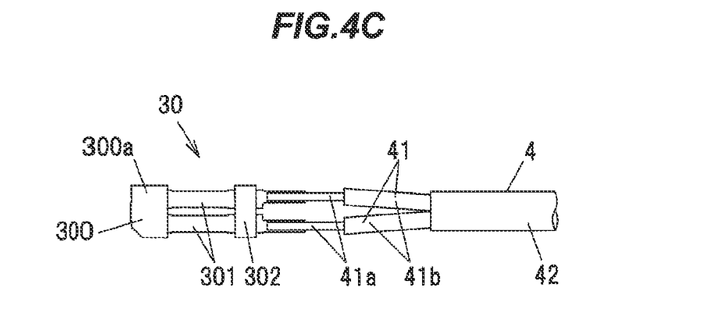
FIG. 4C is a top view showing a magnetic sensor and electric wires.

FIG. 2 is a perspective view showing a sensor section. FIG. 3A is a side view showing the sensor section and FIG. 3B is a cutaway diagram thereof in which a housing is shown as the cross section. FIG. 4A is a top view showing the sensor section, FIG. 4B is a cutaway diagram thereof in which the housing is shown as the cross section, and FIG. 4C is a top view showing a magnetic sensor and electric wires.

As shown in FIGS. 1 to 4, the rotation detection device 1 is provided with a magnetic encoder 2 as a detected member which is mounted to the inner race 11 as a rotating member and has plural magnetic poles (not shown) arranged in a circumferential direction about a rotational axis (the rotational axis line O) of the inner race 11, and a sensor section 3 which is mounted to the knuckle 9 as a stationary member not rotating with rotation of the inner race 11 and is arranged to face the magnetic encoder 2.

The magnetic encoder 2 is formed in an annular shape having a thickness in a direction parallel to the rotational axis line O. The magnetic encoder 2 is supported by a support member 112 fixed to the outer surface 11a of the inner race 11 and is attached so as to rotate together with the inner race 11. In addition, the magnetic encoder 2 has N-poles and S-poles which face the sensor section 3 and are alternately arranged along the circumferential direction.

The sensor section 3 is provided at an end of a cable 4. The cable 4 having the sensor section 3 at an end is a cable with sensor 100 in the present embodiment. In the present embodiment, the magnetic encoder 2 and a tip of the sensor section 3 face each other in an axial direction parallel to the rotational axis line O.

In the rotation detection device 1 of the present embodiment, the sensor section 3 has plural magnetic sensors 30 and a housing portion 31 which is formed of a resin mold collectively covering the plural magnetic sensors 30. In this example, the sensor section 3 having two magnetic sensors 30 will be described.

The cable 4 has plural pairs (two pairs in this example) of electric wires 41 corresponding to the plural magnetic sensors 30. Each electric wire 41 has a center conductor 41a constructed from a stranded conductor formed by twisting highly conductive strands of copper, etc., and an insulation 41b formed of an insulating resin such as cross-linked polyethylene and covering the outer surface of the center conductor 41a. The cable 4 also has a sheath 42 collectively covering two pairs of electric wires 41 (four electric wires 41).

The two pairs of electric wires 41 are exposed from the sheath 42 at an end of the cable 4, and the center conductors 41a are further exposed from the insulations 41b at an end of the electric wires 41. The center conductor 41a exposed from the insulation 41b is electrically connected to a connection terminal 301 of the corresponding magnetic sensor 30 by resistance welding.

The magnetic sensor 30 has a detection section 300 and a pair of connection terminals 301 extending out of the detection section 300.

The detection section 300 has a magnetism detection element (not shown) for detecting a magnetic field from the magnetic encoder 2, a signal processing circuit (not shown) for processing a signal output from the magnetism detection element, and a resin mold 300a as a cover collectively covering the magnetism detection element and the signal processing circuit. The detection section 300 is formed in a substantially rectangular plate shape (a rectangular shape in which one of four corners is chamfered) in a plan view. The detection axis of the magnetism detection element (a magnetic field detecting direction) is the vertical direction in FIG. 4A (a direction of a tangent to a circle having a center on the rotational axis line O).

The pair of connection terminals 301 extend from one long side of the detection section 300 (a long side not connected to the chamfered corner) in a direction perpendicular to the long side, and the two connection terminals 301 are formed parallel to each other. In the present embodiment, the both connection terminals 301 are formed in a strip shape and tips thereof are electrically connected to the center conductors 41a of the corresponding electric wires 41.

The pair of connection terminals 301 of one magnetic sensor 30 located closer to the magnetic encoder 2 (the magnetic sensor 30 located on the lower side in the example shown in FIG. 3B) extend linearly and parallel to each other in the same direction that the center conductors 41a extend. On the other hand, the pair of connection terminals 301 of the other magnetic sensor 30 located farther from the magnetic encoder 2 (the magnetic sensor 30 located on the upper side in the example shown in FIG. 3B) are bent into a crank shape. In detail, the pair of connection terminals 301 of the other magnetic sensor 30 has a portion extending horizontally from a joint with the center conductors 41a in the same direction that the center conductors 41a extend, a portion bent from the horizontal potion and extending toward the one magnetic sensor 30 (obliquely downward left in the example shown in FIG. 3B), and a portion bent from the oblique portion and extending horizontally in the same direction that the center conductors 41a extend.

Although it is not shown in the drawings, a capacitive element for suppressing noise is connected between the two connection terminals 301, and a capacitative element protecting portion 302 formed of a resin mold is provided to cover the capacitative element and a portion of the connection terminals 301 connected to the capacitative element. The capacitative element protecting portion 302 provided on the other magnetic sensor 30 is arranged between the pair of connection terminals 301 of the one magnetic sensor 30 and the pair of the connection terminals 301 of the other magnetic sensor 30 by effectively using a space formed between the pair of linear connection terminals 301 and the pair of crank-shaped connection terminals 301.

In the rotation detection device 1 of the present embodiment, the detection sections 300 of plural (two in this example) magnetic sensors 30 are stacked in a direction along which the sensor section 3 and the magnetic encoder 2 face each other. Also, the detection sections 300 are stacked in a direction intersecting (orthogonal in the present embodiment) with a lead-out direction along which the cable 4 is led out of the housing portion 31. In addition, in the present embodiment, the magnetic sensor 30 arranged farthest from the magnetic encoder 2 has higher sensitivity than the magnetic sensor 30 arranged closest to the magnetic encoder 2. When the cable 4 is bent and an L-shaped housing portion 31 is formed by molding a resin with the bent portion of the cable 4, the detection sections 300 are stacked in the same direction as the lead-out direction along which the cable 4 is led out of the housing portion 31.

The detection sections 300 of the two magnetic sensors 30 are stacked in a thickness direction thereof. That is, in the present embodiment, the direction along which the sensor section 3 and the magnetic encoder 2 face each other coincides with the thickness direction (stacking direction) of the detection sections 300. The direction along which the sensor section 3 and the magnetic encoder 2 face each other here does not need to exactly coincide with the thickness direction (stacking direction) of the detection sections 300, and may be slightly off. In other words, "the detection sections 300 are stacked in a direction along which the sensor section 3 and the magnetic encoder 2 face each other" includes the case where the direction along which the sensor section 3 and the magnetic encoder 2 face each other is several degrees (e.g., ±10°) off the stacking direction of the detection sections 300.

In the present embodiment, since the magnetic encoder 2 and the tip of the sensor section 3 face each other in the axial direction parallel to the rotational axis line O, the thickness direction (stacking direction) of the detection sections 300 coincides with the axial direction. However, it is not limited thereto. For example, when the magnetic encoder 2 and the tip of the sensor section 3 face each other in a radial direction which is perpendicular to the rotational axis line O, the thickness direction (stacking direction) of the detection sections 300 coincides with the radial direction.

In addition, in the present embodiment, the two detection sections 300 are stacked directly. In other words, a surface of one detection section 300 is in contact with a surface of the other detection section 300. Thus, the size can be smaller and a distance between the magnetism detection elements of the two detection sections 300 can be maintained constant more easily than when the two detection sections 300 are arranged at a distance, and in addition to this, detection accuracy can be improved since a distance between the magnetic encoder 2 and the magnetic sensor 30 arranged farther from the magnetic encoder 2 is minimized. In the present embodiment, the two detection sections 300 are not bonded/fixed by an adhesive, etc., and the two detection sections 300 in a stacked state are housed in the housing portion 31.

In addition, the two detection sections 300 are desirably stacked so that the two magnetism detection elements at least partially overlap in the direction along which the sensor section 3 and the magnetic encoder 2 face each other (in the axial direction).

Even when one magnetic sensor 30 fails, it is possible to continue detection by other magnetic sensor(s) 30 since plural magnetic sensors 30 are used, and reliability of the rotation detection device 1 is thereby improved.

In addition, by stacking the detection sections 300 (stacking in the thickness direction), it is possible to compactly arrange the plural magnetic sensors 30 as compared to when, e.g., the sensor section 3 are arranged side by side in a width direction which is perpendicular to the thickness direction. Therefore, the size of the entire sensor section 3 can be kept small even when using plural magnetic sensors 30.

The thickness of the detection section 300 is, e.g., about 1 mm. However, when the detection sections 300 of the two magnetic sensors 30 are arranged at a distance for some reasons or when a distance (gap) between the sensor section 3 and the magnetic encoder 2 is relatively large, magnetic field strength detected by the magnetic sensor 30 located far from the magnetic encoder 2 could become small, causing a decrease in detection accuracy.

Based on this, in the present embodiment, sensitivity of the magnetic sensor 30 arranged farthest from the magnetic encoder 2 is higher than sensitivity of the magnetic sensor 30 arranged closest to the magnetic encoder 2. When using two magnetic sensors 30 as it is in the present embodiment, a magnetic sensor having higher sensitivity than the magnetic sensor 30 arranged on the magnetic encoder 2 side is used as the magnetic sensor 30 arranged on the side opposite to the magnetic encoder 2.

"Higher sensitivity" here means being capable of detecting a smaller magnetic field strength. In other words, "higher sensitivity" means that minimum value of detectable magnetic field strength is smaller.

In the present embodiment, a Hall IC is used as the magnetic sensor 30 arranged on the magnetic encoder 2 side, and a GMR (Giant Magneto Resistive effect) sensor having a higher sensitivity than the Hall IC is used as the magnetic sensor 30 arranged on the side opposite to the magnetic encoder 2. When using the Hall IC as the magnetic sensor 30 arranged on the magnetic encoder 2 side, an AMR (Anisotropic Magneto Restive) sensor or a TMR (Tunneling Magneto Resistive) sensor may be alternatively used as the magnetic sensor 30 arranged on the side opposite to the magnetic encoder 2.

In addition, when more accurate detection of a rotational speed of the inner race 11 with respect to the outer race 12

(a wheel speed) is required, such as when, e.g., detection result of the rotational speed of the inner race 11 with respect to the outer race 12 (the wheel speed) is supposed to be used for a vehicle body stability control system or an indirect air pressure detection device, a GMR sensor or an AMR sensor may be used as the magnetic sensor 30 arranged on the magnetic encoder 2 side, while using a TMR sensor having a higher sensitivity than the GMR sensor or AMR sensor as the magnetic sensor 30 arranged on the side opposite to the magnetic encoder 2. Alternatively, it is also possible to use the same type of magnetic sensors 30 having different sensitivities in such a manner that, e.g., a GMR sensor is used as the magnetic sensor 30 arranged on the magnetic encoder 2 side, and another GMR sensor having a higher sensitivity than the GMR sensor arranged on the magnetic encoder 2 side is used as the magnetic sensor 30 arranged on the side opposite to the magnetic encoder 2. The indirect air pressure detection device here is a device which compares rotational speeds of four wheels (wheel speeds) of a vehicle and thereby detects blowout, etc., occurred on a given wheel.

When using not less than three magnetic sensors 30, sensitivity is higher in the magnetic sensor 30 located farther from the magnetic encoder 2. In more detail, the magnetic sensors 30 other than the magnetic sensor 30 arranged closest to the magnetic encoder 2 have sensitivity equal to or greater than the magnetic sensor(s) 30 located closer to the magnetic encoder 2. That is, when using, e.g., four magnetic sensors 30, it is possible to use Hall ICs having the same sensitivity as two magnetic sensors 30 arranged closer to the magnetic encoder 2, and GMR sensors having the same sensitivity as two magnetic sensors 30 arranged farther from the magnetic encoder 2.

The housing portion 31 integrally has a substantially cylindrical main body 310 collectively covering the magnetic sensor 30 and an end of the cable 4, and a flange 311 for fixing the sensor section 3 to the knuckle 9. A bolt hole 312 for inserting a bolt 92 (see FIG. 1) used to fix the sensor section 3 to the knuckle 9 is formed on the flange 311, and a metal collar 313 for preventing deformation of the flange 311 due to bolt fixation is provided at the bolt hole 312 along the inner surface of the bolt hole 312.

A facing surface 314 which faces the magnetic encoder 2 is formed at a tip portion (an end portion opposite to the side where the cable 4 extends out) of the main body 310 of the housing portion 31. The sensor section 3 is fixed to the knuckle 9 in a state that the facing surface 314 faces the magnetic encoder 2 (facing in the axial direction parallel to the rotational axis line O).

It is possible to use the housing portion 31 formed of, e.g., PA (polyamide) 612 grade, Nylon 66 (Nylon is a registered trademark), or PBT (polybutylene terephthalate), etc. In the present embodiment, PA 612 mixed with glass filler is used as a resin for forming the housing portion 31.

(Modification of Cable with Sensor 100)

Although the cable 4 in the embodiment is formed by collectively covering two pairs of electric wires 41 with the sheath 42, it is not limited thereto. The cable 4 may contain electric wires other than the electric wires 41 for the sensor section 3.

Figure 5A:
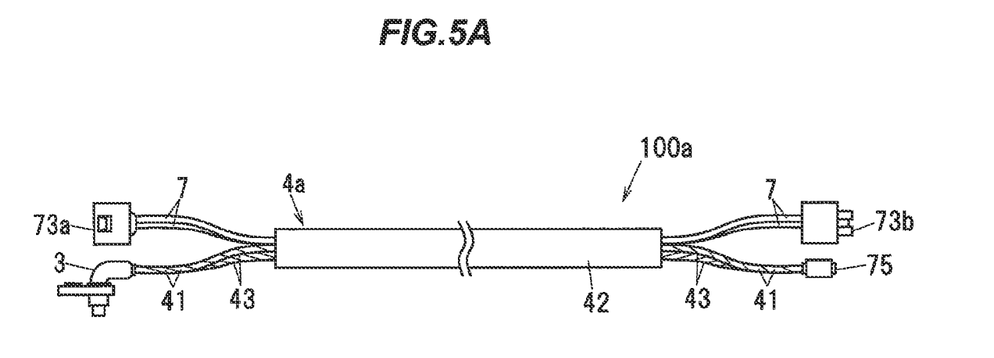
FIG. 5A is an explanatory diagram illustrating a cable with sensor in a modification of the invention.
Figure 5B:
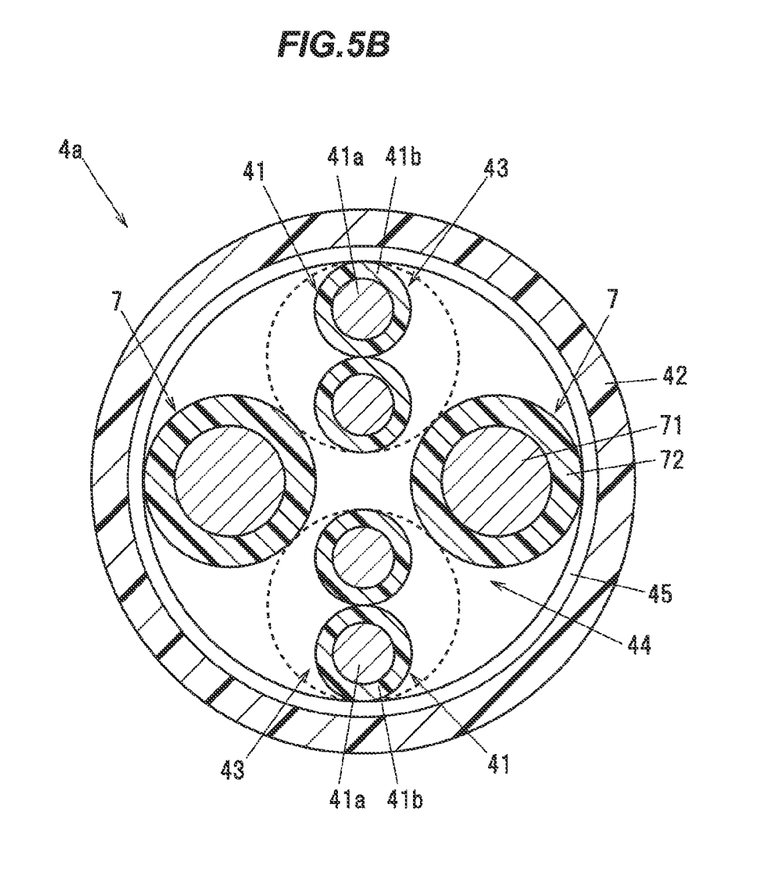
FIG. 5B is a cross sectional view showing the cable shown in FIG. 5A.

In a cable with sensor 100a shown in FIGS. 5A and 5B, a cable 4a is provided with two twisted-pair wires 43 each formed by twisting a pair of electric wires 41, a pair of power wires 7 having larger outer diameter and conductor cross-sectional area than the electric wire 41, a tape member 45 spirally wound around an assembled article 44 which is formed by twisting the twisted-pair wires 43 and the power wires 7 together, and a sheath 42 covering the outer surface of the tape member 45.

The sensor section 3 is provided at one end of the two twisted-pair wires 43. A vehicle body-side sensor connector 75 for connection to a wire group inside a junction box provided on a body of a vehicle is attached to the other end of the two twisted-pair wires 43.

In the present embodiment, the power wires 7 are used for supplying a drive current to a motor (not shown) for an electric parking brake (hereinafter, referred to as "EPB") mounted on a wheel of the vehicle.

EPB is an electric brake system configured to output a drive current to the motor for a predetermined period of time (e.g., for 1 second) when a parking brake activation switch is turned from an OFF state to an ON state during the stationary state of the vehicle so that brake pads are pressed against a disc rotor of the wheel and a braking force to be applied to the wheel is generated. The EPB is also configured to output a drive current to the motor when the parking brake activation switch is turned from the ON state to the OFF state or when an accelerator pedal is depressed so that the brake pads move away from the disc rotor of the wheel and the braking force on the wheel is released. In other words, it is configured that an operating state of the EPB is maintained from when the parking brake activation switch is turned on to when the parking brake activation switch is turned off or the accelerator pedal is depressed.

The power wire 7 has a power wire center conductor 71 and a power wire insulation 72 covering the power wire center conductor 71. The power wire center conductor 71 is constructed from a stranded conductor formed by twisting highly conductive strands of copper, etc., and the power wire insulation 72 is formed of an insulating resin such as cross-linked polyethylene.

A wheel-side power connector 73a for connection to the EPB motor is attached to one end of the pair of power wires 7, and a vehicle body-side power connector 73b for connection to the wire group inside the junction box is attached to the other end of the pair of power wires 7.

The assembled article 44 is formed by twisting the two twisted-pair wires 43 and the pair of power wires 7. In the present embodiment, the power wires 7 are arranged between the two twisted-pair wires 43 in the circumferential direction. In the cross section shown in FIG. 5A, one of the twisted-pair wires 43, one of the power wires 7, the other twisted-pair wire 43 and the other power wire 7 are arranged clockwise in this order.

When the power wires 7 are arranged adjacent to each other in the circumferential direction (when the two twisted-pair wires 43 are arranged adjacent to each other), the center of gravity of the assembled article 44 largely shifts from the center position of the assembled article 44, and the assembled article 44 formed by twisting the two twisted-pair wires 43 and the power wires 7 in such a state is entirely distorted. In this case, it is difficult to manufacture a straight cable 4a and there is also a problem that the cable is not flexible in some directions at some portions in a longitudinal direction, resulting in a decrease in flexibility. By alternately arranging the twisted-pair wires 43 and the power wires 7 in the circumferential direction as in the present embodiment, it is possible to easily realize the straight cable 4a and also to suppress a decrease in flexibility since a defect such as non-flexibility in some directions at some portions in the longitudinal direction is prevented from occurring.

In the EPB, a drive current is supplied to the motor basically when the vehicle is stationary. On the other hand, the rotation detection device 1 is used when the vehicle is in motion and the rotation detection device 1 is not used during when the drive current is supplied through the power wires 7. Therefore, in the present embodiment, a shield conductor around the power wires 7 or the twisted-pair wires 43 is omitted. Omitting the shield conductor allows the cable 4a to have a smaller outer diameter than when providing the shield conductor and also reduces the number of components, thereby reducing the cost.

In addition, in present embodiment, the two twisted-pair wires 43, which transmit an electrical signal during when the vehicle is in motion, are separated by the pair of power wires 7 which supply a drive current to the motor mainly after the vehicle is stopped. This can reduce crosstalk between the two twisted-pair wire 43 even when shield conductors around the twisted-pair wires 43 are omitted.

Plural thread-like (fibrous) fillers extending in the longitudinal direction of the cable 4a may be arranged between the twisted-pair wires 43/the power wires 7 and the tape member 45. In this case, the assembled article 44 is formed by twisting the fillers together with the twisted-pair wires 43 and the power wires 7. Thus, a cross sectional shape after winding the tape member 45 around the assembled article 44 can be closer to a circle. As the filler, it is possible to use a fibrous material such as polypropylene yarn, staple fiber yarn (rayon staple fiber), aramid fiber, nylon fiber or fiber plastic, a paper or a cotton yarn.

The tape member 45 is spirally wound around the assembled article 44. The tape member 45 is in contact with all electric wires (four electric wires 41 and a pair of power wires 7) covered with the tape member 45. The tape member 45 is interposed between the assembled article 44 and the sheath 42 and serves to reduce friction between the assembled article 44 (the electric wires 41 and the power wires 7) and the sheath 42 when being bent. In other words, providing the tape member 45 can reduce friction between the electric wires 41/the power wires 7 and the sheath 42 without a lubricant such as talc powder, and thus reduces stress applied to the electric wires 41 and the power wires 7 when being bent, and it is thereby possible to improve flex resistance.

It is desirable to use the tape member 45 which is slidable (has a low friction coefficient) with respect to the insulation 41b of the electric wire 41 or the power wire insulation 72 of the power wire 7, and it is possible to use the tape member 45 formed of, e.g., a non-woven fabric, paper, or resin (resin film, etc.). The tape member 45 is spirally wound around the assembled article 44 so as to overlap at a portion in a width direction (a direction perpendicular to the longitudinal direction and thickness direction of the tape member 45). The overlapping portion of the tape member 45 is not adhered by an adhesive, etc.

Functions and Effects of the Embodiment

As described above, in the rotation detection device 1 of the present embodiment, the sensor section 3 is provided with plural magnetic sensors 30 each of which has the plate-shaped detection section 300 having a magnetism detection element for detecting a magnetic field from the magnetic encoder 2, a signal processing circuit for processing a signal output from the magnetism detection element, and the resin mold 300a collectively covering the magnetism detection element and the signal processing circuit, and the detection sections 300 are stacked in a direction along which the sensor section 3 and the magnetic encoder 2 face each other.

Due to this configuration, the sensor section 3 can have a small size even when plural magnetic sensors 30 are used to provide redundancy or to improve detection accuracy. In addition, even when, e.g., a gap between the sensor section 3 and the magnetic encoder 2 is large or a stacking interval of the detection sections 300 is large, it is possible to perform detection using plural magnetic sensors 30.

In addition, in the present embodiment, the magnetic sensor 30 arranged farthest from the magnetic encoder 2 has higher sensitivity than the magnetic sensor 30 arranged closest to the magnetic encoder 2. When using two magnetic sensors 30, for example, sensors having sufficiently high sensitivity could be use for the both magnetic sensors 30. In this case, however, the cost of the rotation detection device 1 is increased since the magnetic sensor 30 having high sensitivity is expensive. According to the present embodiment, a highly reliable rotation detection device 1 using plural magnetic sensors 30 can be realized while reducing the cost.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A rotation detection device (1), comprising: a detected member (2) that is mounted to a rotating member (11) and has a plurality of magnetic poles arranged in a circumferential direction about a rotational axis of the rotating member (11); and a sensor section (3) that is mounted to a stationary member (9) not rotating with rotation of the rotating member (11) and is arranged to face the detected member (2), wherein the sensor section (3) comprises a plurality of magnetic sensors (30) each comprising a plate-shaped detection section (300) that comprises a magnetism detection element for detecting a magnetic field from the detected member (2), a signal processing circuit for processing a signal output from the magnetism detection element, and a cover (300a) collectively covering the magnetism detection element and the signal processing circuit, and the detection sections (300) are stacked in a direction along which the sensor section (3) and the detected member (2) face each other.

[2] The rotation detection device (1) defined by [1], wherein the magnetic sensor (30) arranged farthest from the detected member (2) has higher sensitivity than the magnetic sensor (30) arranged closest to the detected member (2).

[3] The rotation detection device (1) defined by [2], wherein the sensor section (3) comprises the two magnetic sensors (30), the magnetic sensor (30) arranged on a side closer to the detected member (2) comprises a Hall IC, and the magnetic sensor (30) arranged on the side opposite to the detected member (2) comprises a GMR sensor, an AMR sensor or a TMR sensor.

[4] The rotation detection device (1) defined by [2], wherein the sensor section (3) comprises the two magnetic sensors (30), the magnetic sensor (30) arranged on a side closer to the detected member (2) comprises a GMR sensor or an AMR sensor, and the magnetic sensor (30) arranged on the side opposite to the detected member (2) comprises a TMR sensor.

[5] A cable with sensor (100) that is used for a rotation detection device (1) comprising a detected member (2) that is mounted to a rotating member (11) and has a plurality of magnetic poles arranged in a circumferential direction about a rotational axis of the rotating member (11), and a sensor section (3) that is mounted to a stationary member (9) not rotating with rotation of the rotating member (11) and is arranged to face the detected member (2), the cable with sensor (100) comprising: a cable (4); and the sensor section (3) provided at an end of the cable (4), wherein the sensor section (3) comprises a plurality of magnetic sensors (30) each comprising a plate-shaped detection section (300) that comprises a magnetism detection element for detecting a magnetic field from the detected member (2), a signal processing circuit for processing a signal output from the magnetism detection element, and a cover (300*a*) collectively covering the magnetism detection element and the signal processing circuit, and the detection sections (300) are stacked in a direction along which the sensor section (3) and the detected member (2) face each other.

[6] The cable with sensor (100) defined by [5], wherein the magnetic sensor (30) arranged farthest from the detected member (2) has higher sensitivity than the magnetic sensor (30) arranged closest to the detected member (2).

[7] The cable with sensor (100*a*) defined by [5] or [6], wherein the rotation detection device (1) is used to detect a rotational speed of the rotating member (11) that rotates at a wheel of a vehicle, and the cable (4) comprises a plurality of pairs of electric wires (41) corresponding to the plurality of magnetic sensors (30), power wires (7) for supplying a drive current to a motor for an electric parking brake mounted on the wheel, and a sheath (42) collectively covering the plurality of pairs of electric wires (41) and the power wires (7).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

For example, although the rotation detection device 1 which detects a wheel speed has been described in the embodiment, it is not limited thereto. The invention is applicable to, e.g., a drive shaft sensor or a crank angle sensor, etc.

REFERENCE SIGNS LIST

1 ROTATION DETECTION DEVICE
2 MAGNETIC ENCODER (DETECTED MEMBER)
3 SENSOR SECTION
30 MAGNETIC SENSOR
300 DETECTION SECTION
300*a* RESIN MOLD (COVER)
301 CONNECTION TERMINAL
31 HOUSING PORTION
4 CABLE
9 KNUCKLE (STATIONARY MEMBER)
10 WHEEL BEARING DEVICE
11 INNER RACE (ROTATING MEMBER)
12 OUTER RACE
13 ROLLING ELEMENT
100 CABLE WITH SENSOR

The invention claimed is:
1. A cable with sensor, comprising:
a cable; and
a sensor section provided at an end of the cable,
wherein the sensor section comprises a plurality of magnetic sensors each comprising a detection section that comprises a magnetism detection element and a cover covering the magnetism detection element, and a housing portion coating the plurality of magnetic sensors and the cable,
wherein the cable comprises an extending portion extending out of the housing portion, and
wherein respective detection sections are arranged to be aligned with each other in a direction intersecting with an extending direction of the cable from the housing portion of the cable,
wherein the respective detection sections are not connected to each other.

2. The cable with sensor according to claim 1, wherein the cable with sensor is configured to be used for a rotation detection device that detects a rotational speed of a rotating member, and
wherein the respective detection sections are arranged to be aligned with the rotation member in the direction intersecting with the extending direction of the cable from the housing portion.

3. The cable with sensor according to claim 1, wherein the sensor section is inserted into a through-hole formed at a stationary member not rotating with rotation of the rotating member, and
wherein the housing portion is inserted in an opposite direction with respect to the extending direction of the cable from the housing portion.

4. The cable with sensor according to claim 1, wherein the plurality of magnetic sensors comprises a plurality of connection terminals extending out of the respective detection sections towards the extending portion of the cable,
wherein the cable comprises a plurality of electric wires connected to the connection terminal of the plurality of magnetic sensors each other.

5. The cable with sensor according to claim 1, wherein the respective detection sections are in contact with each other.

6. The cable with sensor according to claim 5, wherein the respective detection sections are stacked so that the respective magnetism detection elements at least partially overlap in a direction along which the sensor section and a detected member of the rotating member face each other.

7. The cable with sensor according to claim 1, wherein the sensor section is arranged to face a detected member of the rotating member.

8. The cable with sensor according to claim 1, wherein a detection axis of the magnetism detection element a direction of a tangent to a circle having a center on a rotational axis line of the rotating member.

9. The cable with sensor according to claim 7, wherein the magnetic sensor arranged farthest from the detected member has higher sensitivity than the magnetic sensor arranged closest to the detected member.

10. The cable with sensor according to claim 7, wherein a direction along which the sensor section and the detected member face each other coincides with a thickness direction of the detection section.

11. The cable with sensor according to claim 9, wherein the sensor section comprises the two magnetic sensors, the magnetic sensor arranged on a side closer to the detected member comprises a Hall IC, and the magnetic sensor arranged on the side opposite to the detected member comprises a GMR sensor, an AMR sensor or a TMR sensor.

12. The cable with sensor according to claim 9, wherein the sensor section comprises the two magnetic sensors, the magnetic sensor arranged on a side closer to the detected member comprises a GMR sensor or an AMR sensor, and the magnetic sensor arranged on the side opposite to the detected member comprises a TMR sensor.

13. The cable with sensor according to claim 9, wherein the sensor section comprises not less than three magnetic sensors, other than the magnetic sensor arranged closest to the detected member have sensitivity equal to or greater than the magnetic sensor(s) located closer to the magnetic encoder.

14. The cable with sensor according to claim 13, wherein the magnetic sensor arranged on a side closer to the detected member comprises a Hall IC, and the magnetic sensor arranged on the side opposite to the detected member comprises a GMR sensor.

15. The cable with sensor according to claim 4, wherein the cable comprises a one connector that is arranged at an end of the plurality of electric wires and is shared by the plurality of electric wires.

16. The cable with sensor according to claim 15, wherein the cable comprises a plurality of pairs of electric wires corresponding to the plurality of magnetic sensors, power wires for supplying a drive current to a motor for an electric parking brake mounted on the wheel, and a sheath collectively covering the plurality of pairs of electric wires and the power wires.

17. The cable with sensor according to claim 16, wherein the plurality of pairs of electric wires and the power wires are alternately arranging in a circumferential direction of the cable with sensor.

18. The cable with sensor according to claim 16, wherein a shield conductor around the electric wires and the power wires is omitted.

19. The cable with sensor according to claim 16, wherein the pair of electric wires are separated by a pair of power wires.

20. The cable with sensor according to claim 16, wherein a tape member contacts the plurality of pairs of electric wires and the power wires each other.

21. The cable with sensor according to claim 4, wherein each of the plurality of connection terminals comprises a portion parallel to an extending direction.

22. The cable with sensor according to claim 1, wherein, a virtual extension of a portion of the cable covered by the housing portion passes through the respective detection sections.

* * * * *